US012631278B2

(12) United States Patent
Lemmers, Jr. et al.

(10) Patent No.: US 12,631,278 B2
(45) Date of Patent: May 19, 2026

(54) REPLACEABLE FLUID LINE TERMINATION FITTINGS

(71) Applicant: Hamilton Sundstrand Corporation, Charlotte, NC (US)

(72) Inventors: Glenn C. Lemmers, Jr., Loves Park, IL (US); Mark J. Franklin, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 208 days.

(21) Appl. No.: 18/105,746

(22) Filed: Feb. 3, 2023

(65) Prior Publication Data

US 2024/0263725 A1     Aug. 8, 2024

(51) Int. Cl.
| | |
|---|---|
| *F16L 41/08* | (2006.01) |
| *F02C 7/00* | (2006.01) |
| *F16L 15/04* | (2006.01) |

(52) U.S. Cl.
CPC ............... *F16L 41/08* (2013.01); *F02C 7/00* (2013.01); *F16L 15/04* (2013.01);
(Continued)

(58) Field of Classification Search
CPC ......... F16L 15/04; F16L 41/086; F16L 41/10; F16L 41/08; F16L 41/14; F02D 2260/60;
(Continued)

(56) References Cited

U.S. PATENT DOCUMENTS

| | | | | |
|---|---|---|---|---|
| 4,280,721 A | * | 7/1981 | Narkon | F16L 41/007 |
| | | | | 285/212 |
| 5,330,237 A | * | 7/1994 | Suzuki | F16L 41/007 |
| | | | | 285/98 |

(Continued)

FOREIGN PATENT DOCUMENTS

| | | |
|---|---|---|
| CA | 3157653 A1 | 10/2022 |
| EP | 3632800 A1 | 4/2020 |

(Continued)

OTHER PUBLICATIONS

European Search Report dated Jul. 1, 2024 in connection with European Patent Application No. 24155376.7, 7 pages.

*Primary Examiner* — David Bochna

(57) ABSTRACT

A fluid line termination fitting for a tail cone generator can include a distal body portion configured to insert into a fluid circuit opening of a tail cone generator housing and a proximal body portion configured to receive a male fluid connector. The fitting can include a radial extension disposed axially between the distal portion and the proximal portion. The radial extension can extend radially outwardly relative to the distal portion and proximal portion to limit insertion of the distal body portion into the opening of the tail cone generator housing. The fitting can include a channel structure defining a flow channel through the distal body portion and the proximal body portion. The channel structure can include a proximal channel portion in fluid communication with a proximal opening and a distal channel portion in fluid communication with a distal opening. The (Continued)

fitting can include a threaded section in the proximal channel portion and configured to thread to the male fluid connector and an angled sealing face distal of the threaded section and extending radially inward between the proximal channel portion and the distal channel portion. The angled sealing face can be configured to flushly mate with a complimentary angled surface on the male fluid connector.

20 Claims, 7 Drawing Sheets

(52) U.S. Cl.
CPC ...... *F05D 2220/32* (2013.01); *F05D 2220/76* (2013.01); *F05D 2260/60* (2013.01)

(58) Field of Classification Search
CPC ........ F02D 9/065; F02C 7/00; F05D 2260/60; F01D 9/065
USPC ....... 285/384, 385, 219, 217, 220, 207, 201, 285/211, 212
See application file for complete search history.

(56) References Cited

U.S. PATENT DOCUMENTS

| | | | |
|---|---|---|---|
| 5,474,098 | A | 12/1995 | Grigorian et al. |
| 6,102,577 | A | 8/2000 | Tremaine |
| 6,439,616 | B1 * | 8/2002 | Karafillis ................ F01D 9/065 285/205 |
| 2001/0028170 | A1 * | 10/2001 | Sausner .................. F16L 19/00 285/256 |
| 2012/0299292 | A1 * | 11/2012 | Watanabe ............. F16L 41/086 285/335 |
| 2018/0187814 | A1 * | 7/2018 | Laule .................... F16L 41/086 |
| 2018/0224043 | A1 * | 8/2018 | Hendrickson ........... F01D 9/065 |
| 2019/0063241 | A1 * | 2/2019 | Colebrook ............. F01D 9/065 |
| 2020/0332921 | A1 * | 10/2020 | Marshall ................ F01D 9/065 |
| 2021/0281145 | A1 | 9/2021 | Lemmers, Jr. |
| 2022/0340290 | A1 * | 10/2022 | Servant .................. F01D 9/065 |

FOREIGN PATENT DOCUMENTS

| | | |
|---|---|---|
| EP | 3730741 A1 | 10/2020 |
| EP | 3879074 A1 | 9/2021 |

* cited by examiner

300

Oil Supply

105

300

Air Return

Oil
Scavenge

105

300

600

REPLACEABLE FLUID LINE
TERMINATION FITTINGS

FIELD

This disclosure relates to fluid line termination fittings.

BACKGROUND

Certain systems, e.g., aircraft generators can utilize a sealed fluid system (e.g., for oil circulation, for air circulation). The fluid system can include an angled hose end for sealing to a generator housing, for example.

Conventional methods and systems have generally been considered satisfactory for their intended purpose. However, there is still a need in the art for improvements. The present disclosure provides a solution for this need.

SUMMARY

A fluid line termination fitting for a tail cone generator can include a distal body portion configured to insert into a fluid circuit opening of a tail cone generator housing and a proximal body portion configured to receive a male fluid connector. The fitting can include a radial extension disposed axially between the distal portion and the proximal portion. The radial extension can extend radially outwardly relative to the distal portion and proximal portion to limit insertion of the distal body portion into the opening of the tail cone generator housing. The fitting can include a channel structure defining a flow channel through the distal body portion and the proximal body portion. The channel structure can include a proximal channel portion in fluid communication with a proximal opening and a distal channel portion in fluid communication with a distal opening. The fitting can include a threaded section in the proximal channel portion and configured to thread to the male fluid connector and an angled sealing face distal of the threaded section and extending radially inward between the proximal channel portion and the distal channel portion. The angled sealing face can be configured to flushly mate with a complimentary angled surface on the male fluid connector.

The angled sealing face can be or include a 37 degree surface, for example. Other suitable degree angles are contemplated herein that provide a complimentary sealing face to flushly mate with the complimentary angled surface of the male fluid connector to provide a sealed relationship.

The distal body portion can include a seal channel defined therein and configured to receive a sealing member to seal the distal body portion to the tail cone generator housing. In certain embodiments, the fitting can include the seal. The channel structure can include a relief annulus defined in the proximal channel portion proximal of and/or adjacent to the angled sealing face. The distal channel portion can have smaller inner diameter than the proximal channel portion, for example.

The radial extension can be configured to mount to the tail cone generator housing. The fitting can be a single piece. In certain embodiments, the fitting can be metallic. Any suitable number of pieces attached together or formed together and/or any suitable material are contemplated herein.

In accordance with at least one aspect of this disclosure, a tail cone generator assembly can include a tail cone generator configured to be disposed within a tail cone of a turbomachine. The tail cone generator can include a tail cone generator housing having a fluid circuit opening. The tail cone generator assembly can include a fluid line termination fitting attached to the tail cone generator housing. The fluid termination fitting can include any suitable fitting disclosed herein, e.g., as described above.

In accordance with at least one aspect of this disclosure, a fluid line termination fitting can be applied for any suitable application. Embodiments of a fluid line termination fitting can be or include any suitable fitting disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
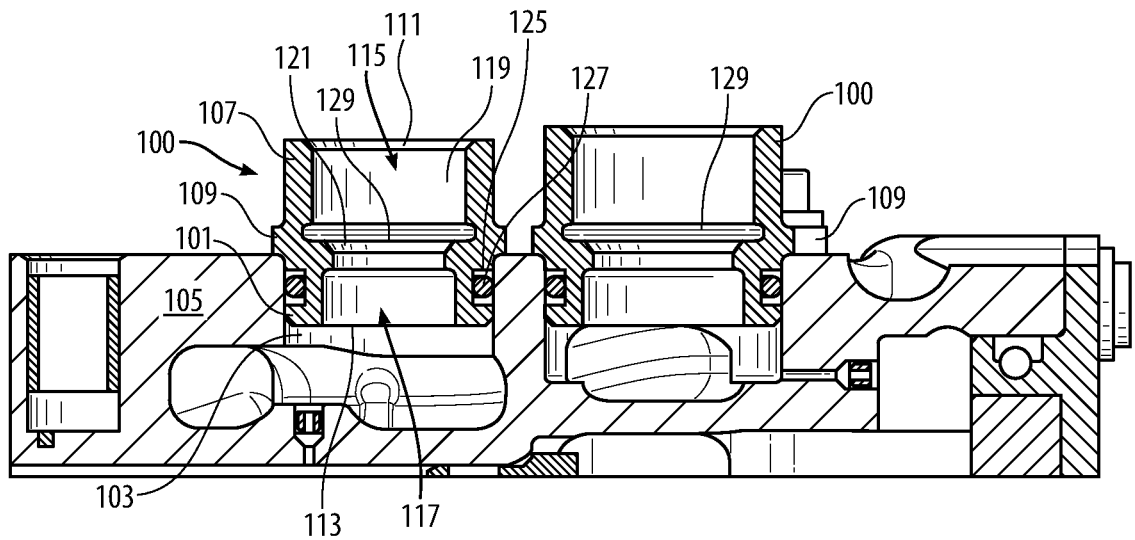
FIG. 1 is a cross-sectional view of an embodiment of a fitting in accordance with this disclosure, shown disposed in and attached to an embodiment of a tail cone generator housing.

Reference will now be made to the drawings wherein like reference numerals identify similar structural features or aspects of the subject disclosure. For purposes of explanation and illustration, and not limitation, an illustrative view of an embodiment of a fitting in accordance with the disclosure is shown in FIG. 1 and is designated generally by reference character 100. Other embodiments and/or aspects of this disclosure are shown in FIGS. 2-8. Certain embodiments described herein can be used to provide a serviceable and replaceable sealed termination, for example, to mitigate housing scrapping and/or reworking.

Figure 2:
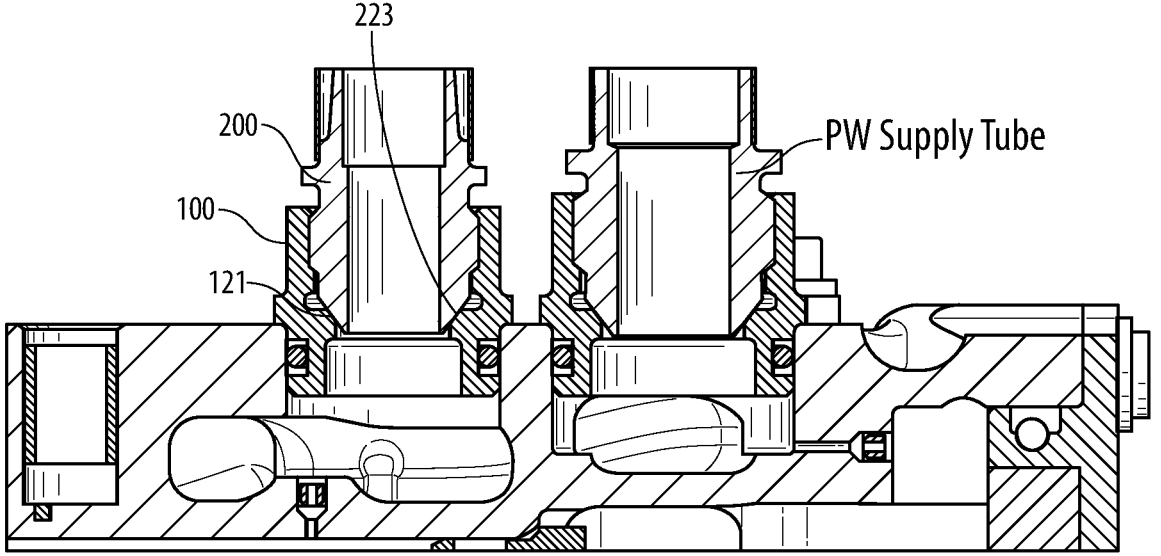
FIG. 2 is a cross-sectional view of the embodiment of FIG. 1, shown having a male fluid connector threaded into and sealed against an angled sealing face.

Referring to FIG. 1, a fluid line termination fitting 100 for a tail cone generator 300 can include a distal body portion 101 configured to insert into a fluid circuit opening 103 of a tail cone generator housing 105. The distal body portion 101 can be slip fit into the opening 103 with a tight clearance fit (e.g., 1-2 mil). The fitting 100 can include a proximal body portion 107 configured to receive a male fluid connector 200 (e.g., as shown in FIG. 2).

The fitting 100 can include a radial extension 109 disposed axially between the distal portion 101 and the proximal portion 107. The radial extension 109 can extend radially outwardly relative to the distal portion 101 and proximal portion 107 to limit insertion of the distal body portion 101 into the opening 103 of the tail cone generator housing 105.

The fitting 100 can include a channel structure (e.g., the interior surfaces of the fitting 100) defining a flow channel through the distal body portion 101 and the proximal body portion 107 (e.g., from a proximal opening 111 to a distal opening 113. The channel structure can include a proximal channel portion 115 in fluid communication with a proximal opening 111 and a distal channel portion 117 in fluid communication with a distal opening 113. The fitting 100 can include a threaded section 119 in the proximal channel portion 115 which can be configured to thread to the male fluid connector 200. The fitting 100 can also include an angled sealing face 121 distal of the threaded section 119 and extending radially inward (e.g., forming a channel area reduction) between the proximal channel portion and the distal channel portion. The angled sealing face 121 can be configured to flushly mate with a complimentary angled surface 223 on the male fluid connector 200.

The angled sealing face 121 can be or include a 37 degree surface, for example. Other suitable degree angles are contemplated herein that provide a complimentary sealing face to flushly mate with the complimentary angled surface 223 of the male fluid connector 200 to provide a sealed relationship.

The distal body portion 101 can include a seal channel 125 defined therein and configured to receive a sealing member 127 to seal the distal body portion 101 to the tail cone generator housing 105. In certain embodiments, the fitting 100 can include the seal 127. The channel structure can include a relief annulus 129 defined in the proximal channel portion 115 proximal of and/or adjacent to the angled sealing face 121. In certain embodiments, the distal channel portion 117 can have smaller inner diameter than the proximal channel portion 115, for example (e.g., as shown).

The radial extension 109 can be configured to mount to the tail cone generator housing 105. In certain embodiments, the fitting 100 can be a single piece. In certain embodiments, the fitting can be metallic (e.g., stainless steel), for example. Any suitable number of pieces attached together or formed together and/or any suitable material are contemplated herein.

Figure 3:
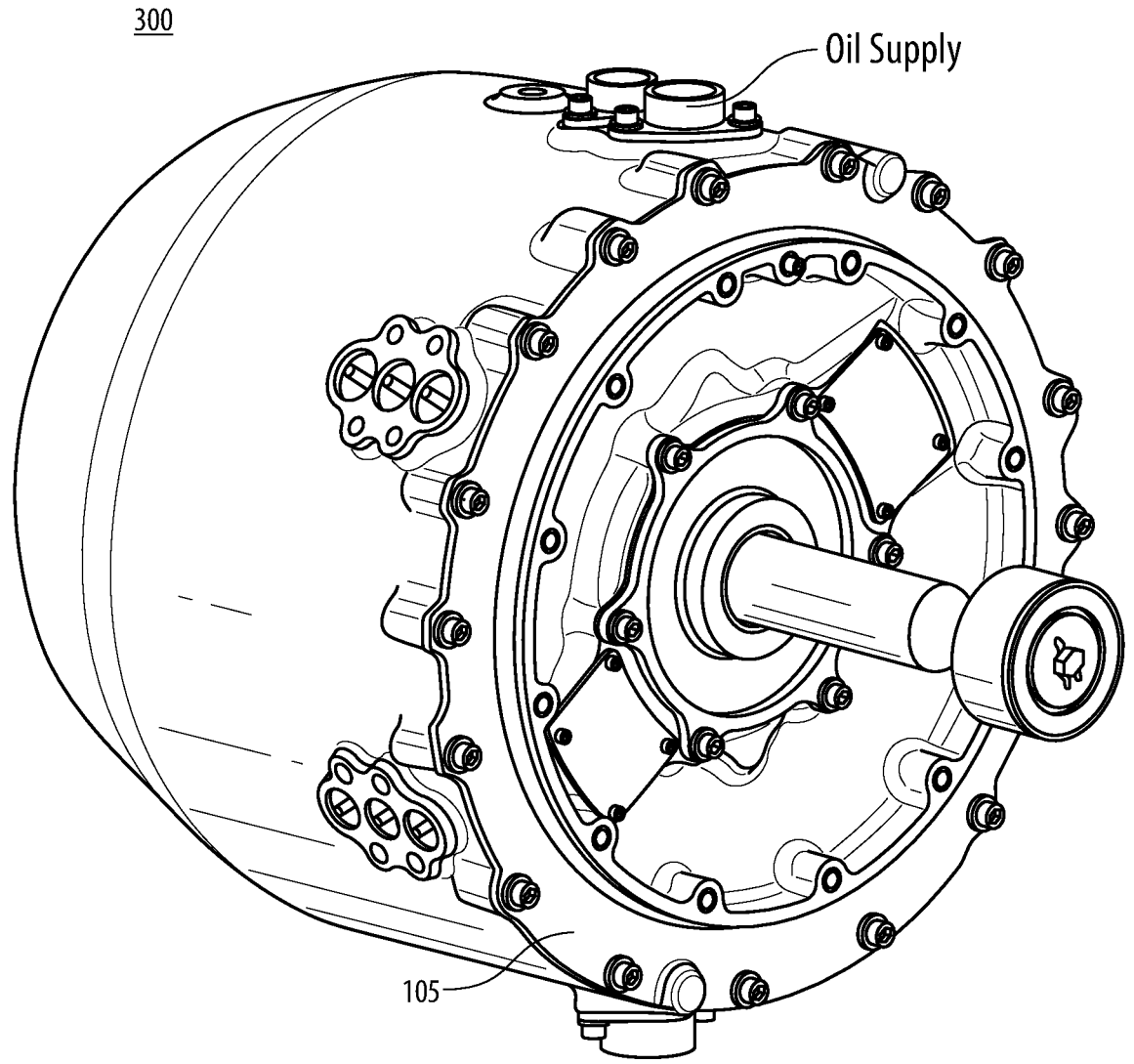
FIG. 3 is a front perspective view of a tail cone generator assembly in accordance with this disclosure, shown having the fitting of FIG. 1 disposed thereon.
Figure 4:
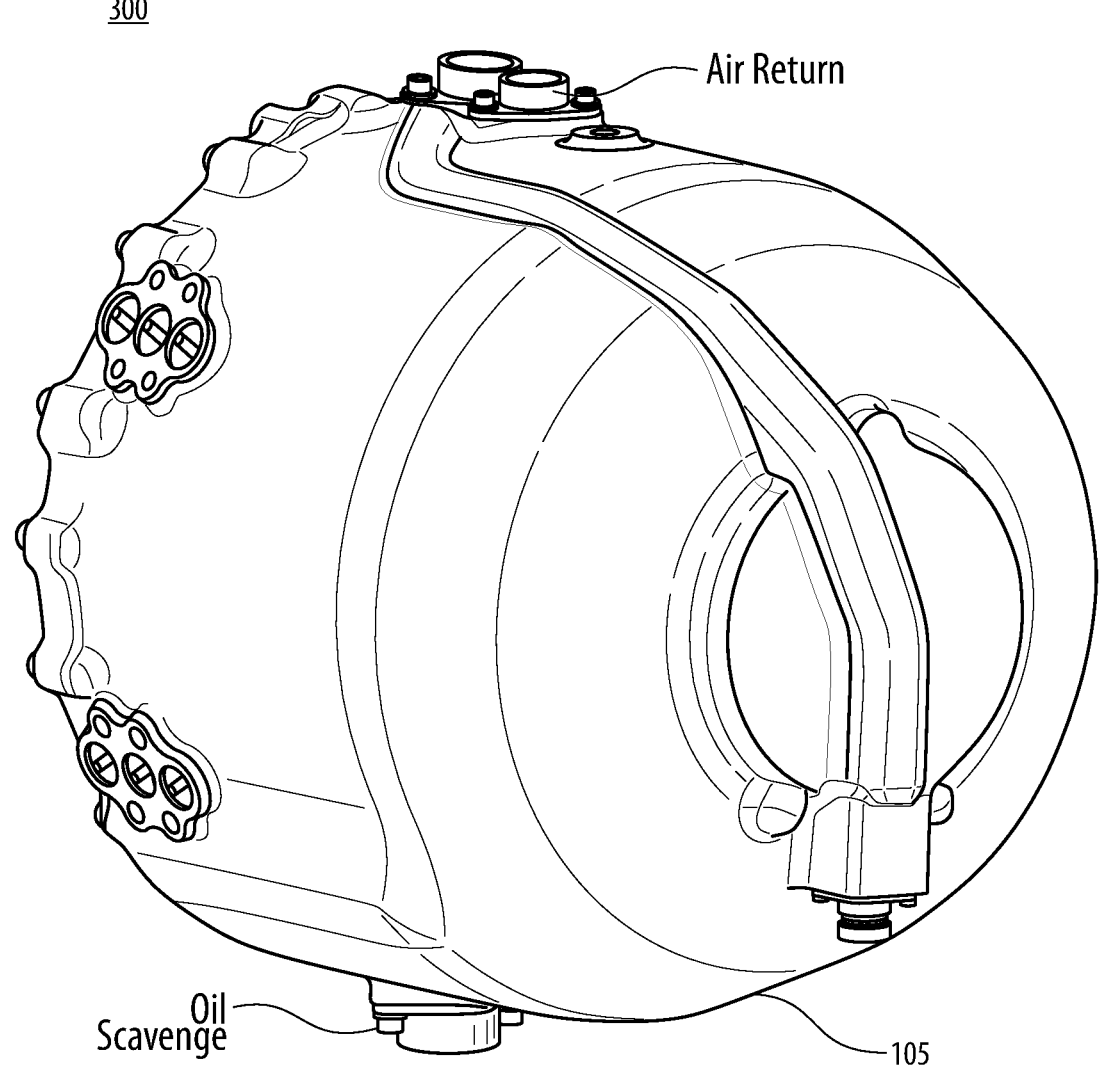
FIG. 4 is a rear perspective view of the embodiment of FIG. 3.
Figure 5:
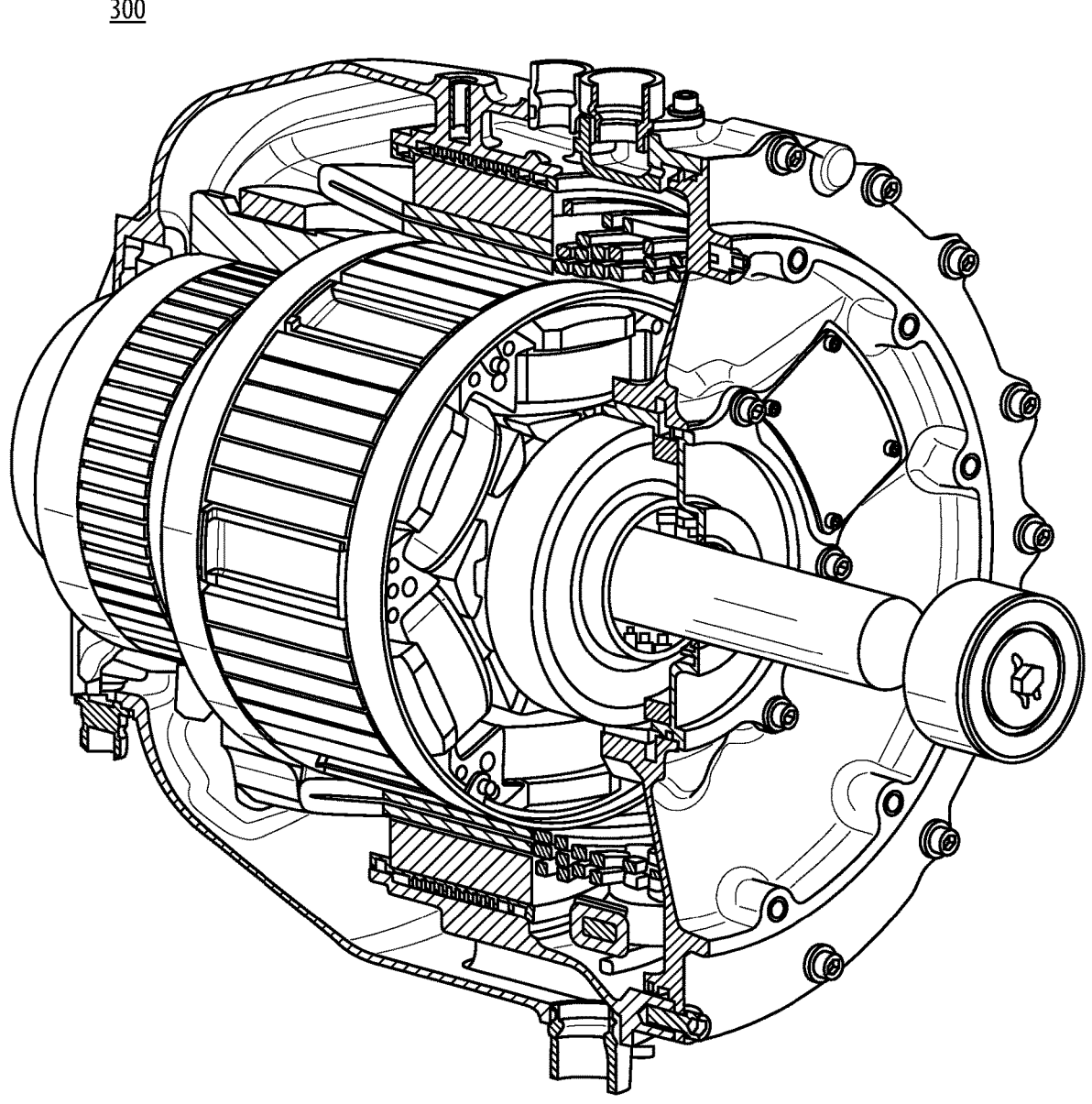
FIG. 5 is a perspective cross-sectional view of the embodiment of FIG. 3.
Figure 6:
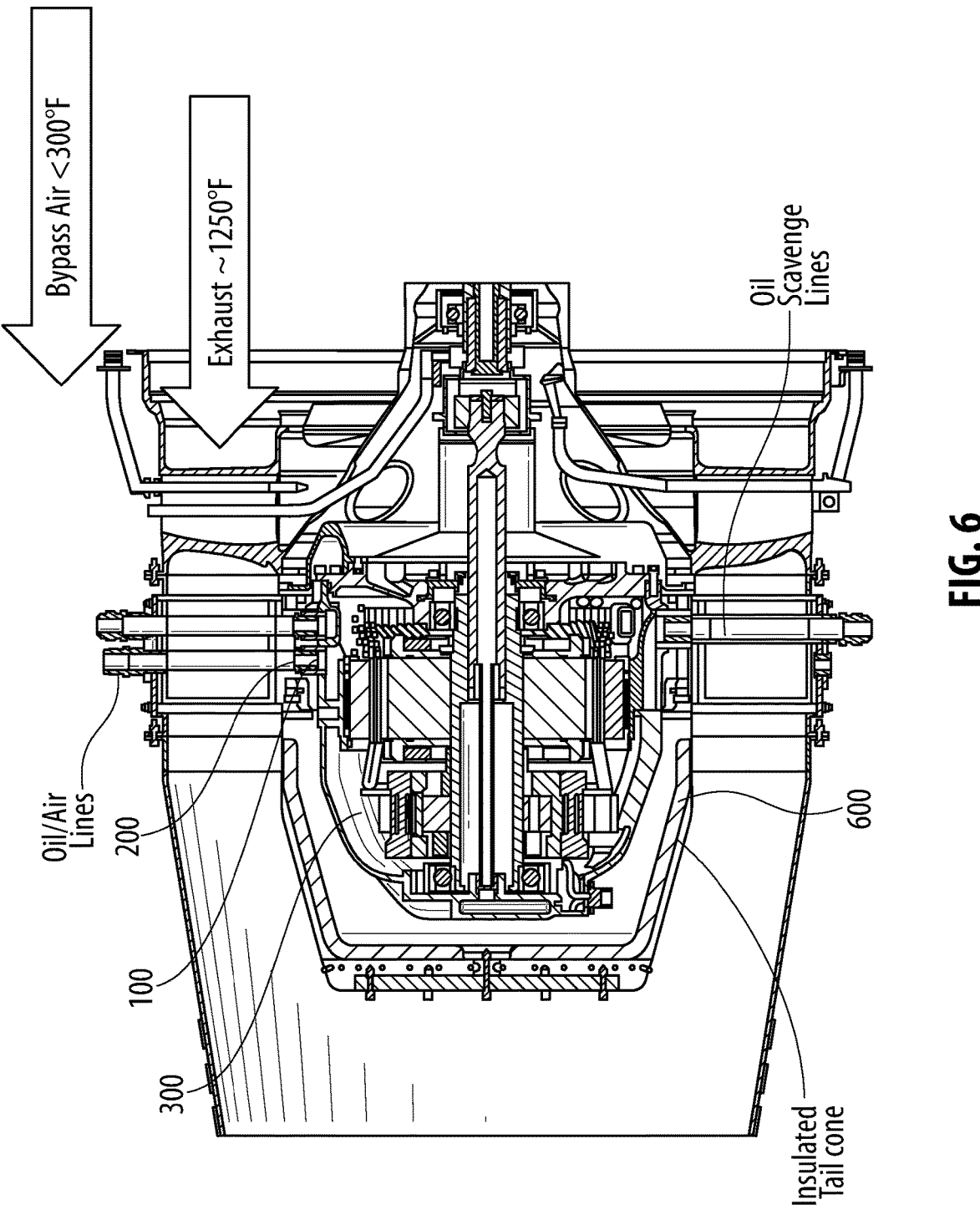
FIG. 6 is a cross-sectional view of the assembly of FIG. 3, shown disposed within the tail cone of a turbomachine.
Figure 7:
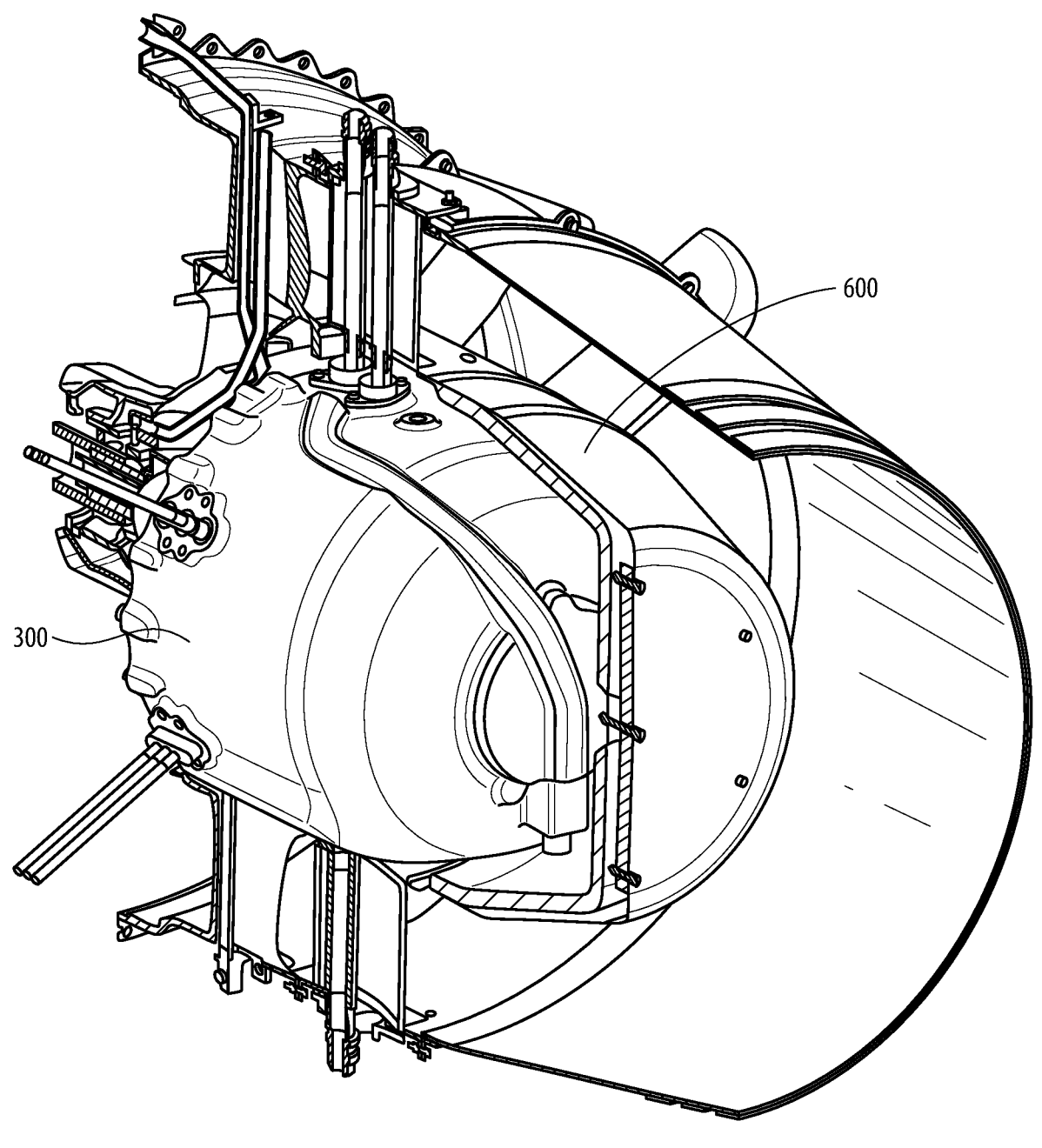
FIG. 7 is a partially sectioned perspective view of the embodiment of FIG. 6.
Figure 8:
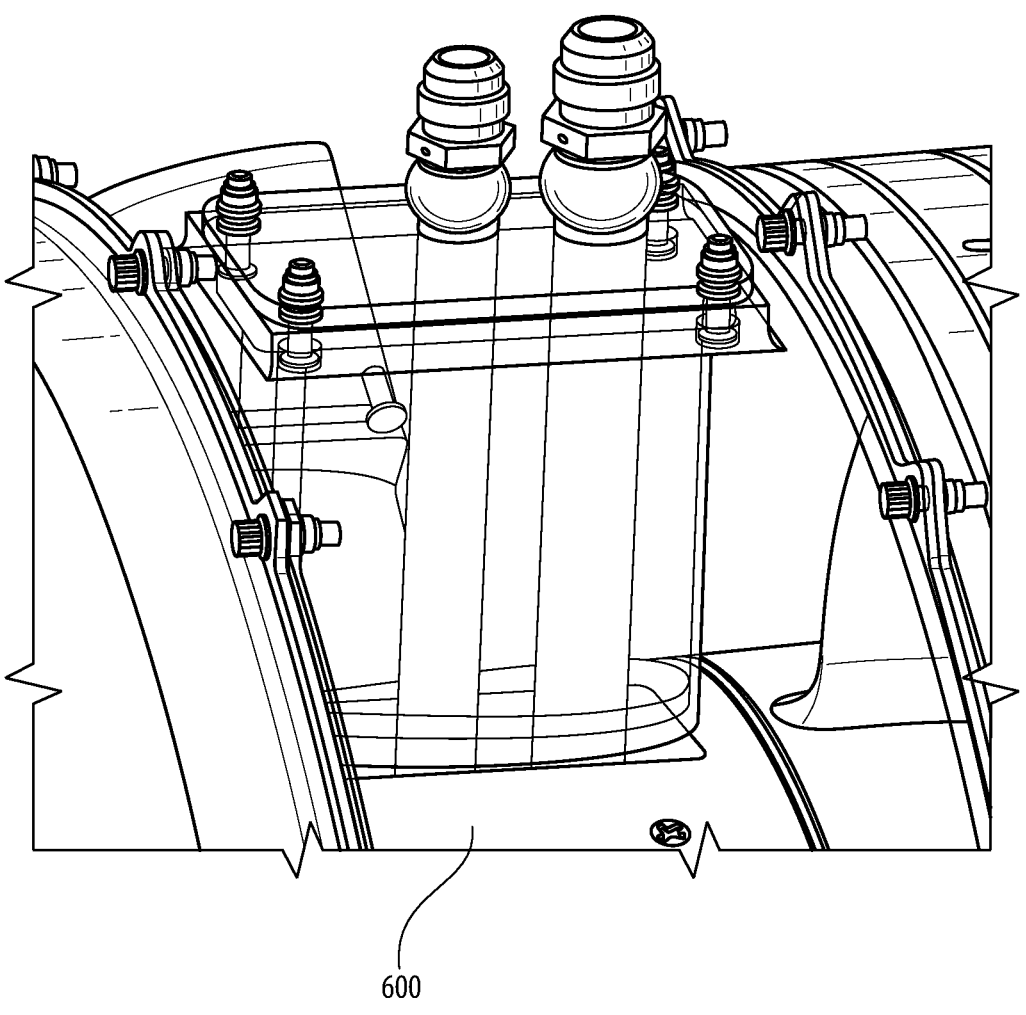
FIG. 8 is a perspective view showing a fluid line assembly within a strut, which connect to the fitting of FIG. 1 as shown in FIG. 2, for example.

FIG. 3 is a front perspective view of a tail cone generator assembly in accordance with this disclosure, shown having the fitting of FIG. 1 disposed thereon. FIG. 4 is a rear perspective view of the embodiment of FIG. 3. FIG. 5 is a perspective cross-sectional view of the embodiment of FIG. 3. FIG. 6 is a cross-sectional view of the assembly of FIG. 3, shown disposed within the tail cone of a turbomachine. FIG. 7 is a partially sectioned perspective view of the embodiment of FIG. 6. FIG. 8 is a perspective view showing a fluid line assembly within a strut, which connect to the fitting of FIG. 1 as shown in FIG. 2, for example.

In accordance with at least one aspect of this disclosure, referring to FIG. 3, a tail cone generator assembly can include a tail cone generator 300 configured to be disposed within a tail cone 600 of a turbomachine. The tail cone generator 300 can include a tail cone generator housing 105 having a fluid circuit opening 103. The tail cone generator assembly can include a fluid line termination fitting 100 attached to the tail cone generator housing 105. The fluid termination fitting 100 can include any suitable fitting disclosed herein, e.g., as described above. In tail cone systems, the bypass air can be 300° F., but the exhaust can be about 1250° F. around the insulated tail cone for example. As shown in FIGS. 6-8, feeders, air/oil lines, and excitation wiring can be routed through service struts that bridge across exhaust flow.

In accordance with at least one aspect of this disclosure, the fluid line termination fitting 100 can be applied to any suitable application and is not limited to tail cone generation application. Embodiments of a general fluid line termination fitting can be or include any suitable fitting disclosed herein, e.g., as described above.

Embodiments of a fitting can include an inner diameter at a top that is threaded. Embodiments of a fitting can include an annular inner cut (e.g., a thread relief). Embodiments of a fitting can include radial extension (e.g., a flange) for stopping and also bolting the fitting to a housing (e.g., at two points). Embodiments can provide a metal to metal seal when connected to the male connector. Embodiments of a fitting can include a 37 degree surface, but allow mounting without a tube nut, for example. Embodiments of a fitting can be used for oil-in, oil-scavenge, and air return ports, for example, on a generator.

Embodiments can provide replaceable ports on a generator to mitigate housing scrap/rework costs, for example. Embodiments of a fitting can receive and support 37° flare tube ends. Embodiments can bottom onto port seats through thin crush seals, for example. Embodiments of a fitting can be attached to an investment cast/machined titanium housing, allowing replacement of the fittings instead of scrapping and reworking of the expensive housing. Embodiments can provide a replaceable design was conceived to mitigate scrapping expensive castings should a manufacturing error occur or if the metal sealing surface is damaged by foreign object debris during aircraft/engine mating of a 37° male tube fitting installation Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fluid line termination fitting for a tail cone generator, comprising:

a distal body portion configured to be inserted into an opening of a fluid circuit of a tail cone generator housing;

a proximal body portion configured to receive a male fluid connector;

a radial extension disposed axially between the distal body portion and the proximal body portion, the radial extension extending radially outwardly relative to the distal body portion and the proximal body portion to limit insertion of the distal body portion into the opening of the tail cone generator housing;

a channel structure defining a flow channel through the distal body portion and the proximal body portion, the channel structure including a proximal channel portion in fluid communication with a proximal opening and a distal channel portion in fluid communication with a distal opening, wherein the distal opening is configured to be in fluid communication with the fluid circuit at a location of the opening of the fluid circuit when the distal body portion is inserted into the opening of the fluid circuit;

a threaded section in the proximal channel portion and configured to thread to the male fluid connector;

an angled sealing face distal of the threaded section and extending radially inward between the proximal channel portion and the distal channel portion, wherein the angled sealing face is configured to flushly mate with a complimentary angled surface on the male fluid connector; and a relief annulus defined in the proximal channel portion proximal of and/or adjacent to the angled sealing face.

2. The fitting of claim 1, wherein the angled sealing face is or includes a 37 degree surface.

3. The fitting of claim 1, wherein the distal body portion includes a seal channel defined therein and configured to receive a sealing member to seal the distal body portion to the tail cone generator housing.

4. The fitting of claim 3, further comprising the seal.

5. The fitting of claim 1, wherein the radial extension is configured to mount to the tail cone generator housing.

6. The fitting of claim 1, wherein the distal channel portion has a smaller inner diameter than the proximal channel portion.

7. The fitting of claim 1, wherein the fitting is a single piece.

8. The fitting of claim 7, wherein the fitting is metallic.

9. A tail cone generator assembly, comprising:

a tail cone generator configured to be disposed within a tail cone of a turbomachine, the tail cone generator including a tail cone generator housing having a fluid circuit opening; and a fluid line termination fitting attached to the tail cone generator housing, the fluid line termination fitting comprising:

a distal body portion inserted into the fluid circuit opening of the tail cone generator housing, wherein the distal body portion includes a seal channel defined therein and configured to receive a sealing member to seal the distal body portion to the tail cone generator housing;

a proximal body portion configured to receive a male fluid connector;

a radial extension disposed axially between the distal body portion and the proximal body portion, the radial extension extending radially outwardly relative to the distal body portion and the proximal body portion to limit insertion of the distal body portion into the fluid circuit opening of the tail cone generator housing;

a channel structure defining a flow channel through the distal body portion and the proximal body portion, the channel structure including a proximal channel portion in fluid communication with a proximal opening and a distal channel portion in fluid communication with a distal opening;

a threaded section in the proximal channel portion and configured to thread to the male fluid connector;

an angled sealing face distal of the threaded section and extending radially inward between the proximal channel portion and the distal channel portion, wherein the angled sealing face is configured to flushly mate with a complimentary angled surface on the male fluid connector; and a relief annulus defined in the proximal channel portion proximal of and/or adjacent to the angled sealing face.

10. The assembly of claim 9, wherein the angled sealing face is or includes a 37 degree surface.

11. The assembly of claim 9, wherein the distal opening is configured to be in fluid communication with a fluid circuit at a location of the fluid circuit opening.

12. The assembly of claim 9, further comprising the seal.

13. The assembly of claim 9, wherein the radial extension is configured to mount to the tail cone generator housing.

14. The assembly of claim 9, wherein the distal channel portion has a smaller inner diameter than the proximal channel portion.

15. The assembly of claim 9, wherein the fluid line termination fitting is a single piece.

16. The assembly of claim 15, wherein the fluid line termination fitting is metallic.

17. A fluid line termination fitting, comprising:

a distal body portion configured to be slip fit into an opening of a fluid circuit of a housing;

a proximal body portion configured to receive a male fluid connector;

a radial extension disposed axially between the distal body portion and the proximal body portion, the radial extension extending radially outwardly relative to the distal body portion and the proximal body portion to limit insertion of the distal body portion into the opening of the housing;

a channel structure defining a flow channel through the distal body portion and the proximal body portion, the channel structure including a proximal channel portion in fluid communication with a proximal opening and a distal channel portion in fluid communication with a distal opening, wherein the distal opening is configured to be in fluid communication with the fluid circuit at a location of the opening of the fluid circuit when the distal body portion is inserted into the opening of the fluid circuit;

a threaded section in the proximal channel portion and configured to thread to the male fluid connector;

an angled sealing face distal of the threaded section and extending radially inward between the proximal channel portion and the distal channel portion, wherein the angled sealing face is configured to flushly mate with a complimentary angled surface on the male fluid connector; and a relief annulus defined in the proximal channel portion proximal of and/or adjacent to the angled sealing face.

18. The fluid line termination fitting of claim 17, wherein the distal body portion includes a seal channel defined therein and configured to receive a sealing member to seal the distal body portion to the housing.

19. The fluid line termination fitting of claim 17, wherein the fluid line termination fitting is a single piece.

20. The fluid line termination fitting of claim 17, wherein the radial extension is configured to mount to a tail cone generator housing.

* * * * *